United States Patent

[11] 3,563,594

[72] Inventor Arnold B. London
345 S. Rexford Drive, Beverly Hills, Calif. 90212
[21] Appl. No. 821,403
[22] Filed May 2, 1969
[45] Patented Feb. 16, 1971

[54] RETRACTABLE FLEXIBLE CAR BODY PROTECTOR
4 Claims, 9 Drawing Figs.

[52] U.S. Cl. .................................................. 293/1;
105/324; 150/52, 160/368, 293/41, 46, 62;
293/64, 69; 296/98; 312/3
[51] Int. Cl. .................................................. B60j 11/00;
B60r 19/00; B61d 39/00
[50] Field of Search ................................... 4/149;
105/324; 135/1; 150/52; 160/24, 368; 161/39; 293/9,
17, 30, 40, 41, 46, 62, 69; 296/98; 312/3; 160/368;
293/1, 41, 46, 62, 64, 69

[56] References Cited
UNITED STATES PATENTS

| | | | |
|---|---|---|---|
| 473,292 | 4/1892 | Campbell et al. | 296/98 |
| 486,459 | 11/1892 | Gerhard | 312/3 |
| 1,679,886 | 8/1928 | Wright | 296/98X |
| 1,707,121 | 3/1929 | Hartzell et al. | 296/98 |
| 2,639,751 | 5/1953 | Flaherty | 150/52 |
| 2,723,156 | 11/1955 | Stanziale | 296/98 |
| 2,994,356 | 4/1961 | Fleming | 293/62X |
| 3,021,894 | 2/1962 | LaDue | 296/98X |
| 3,107,361 | 10/1963 | Glutting, Sr. | 4/149 |
| 3,146,824 | 9/1964 | Veilleux | 296/98X |
| 3,147,176 | 9/1964 | Haslam | 161/39 |
| 3,263,736 | 8/1966 | Macomson | 160/368 |

Primary Examiner—Arthur L. La Point
Assistant Examiner—Howard Beltran
Attorney—Smyth, Roston & Pavitt ABSTRACT: A flexible protective sheet wound on a spring-actuated roller in a casing mounted below and at the lower edge of a vehicle body is extendible upward over the side surface of the body to be releasably held in place by permanent magnet means.

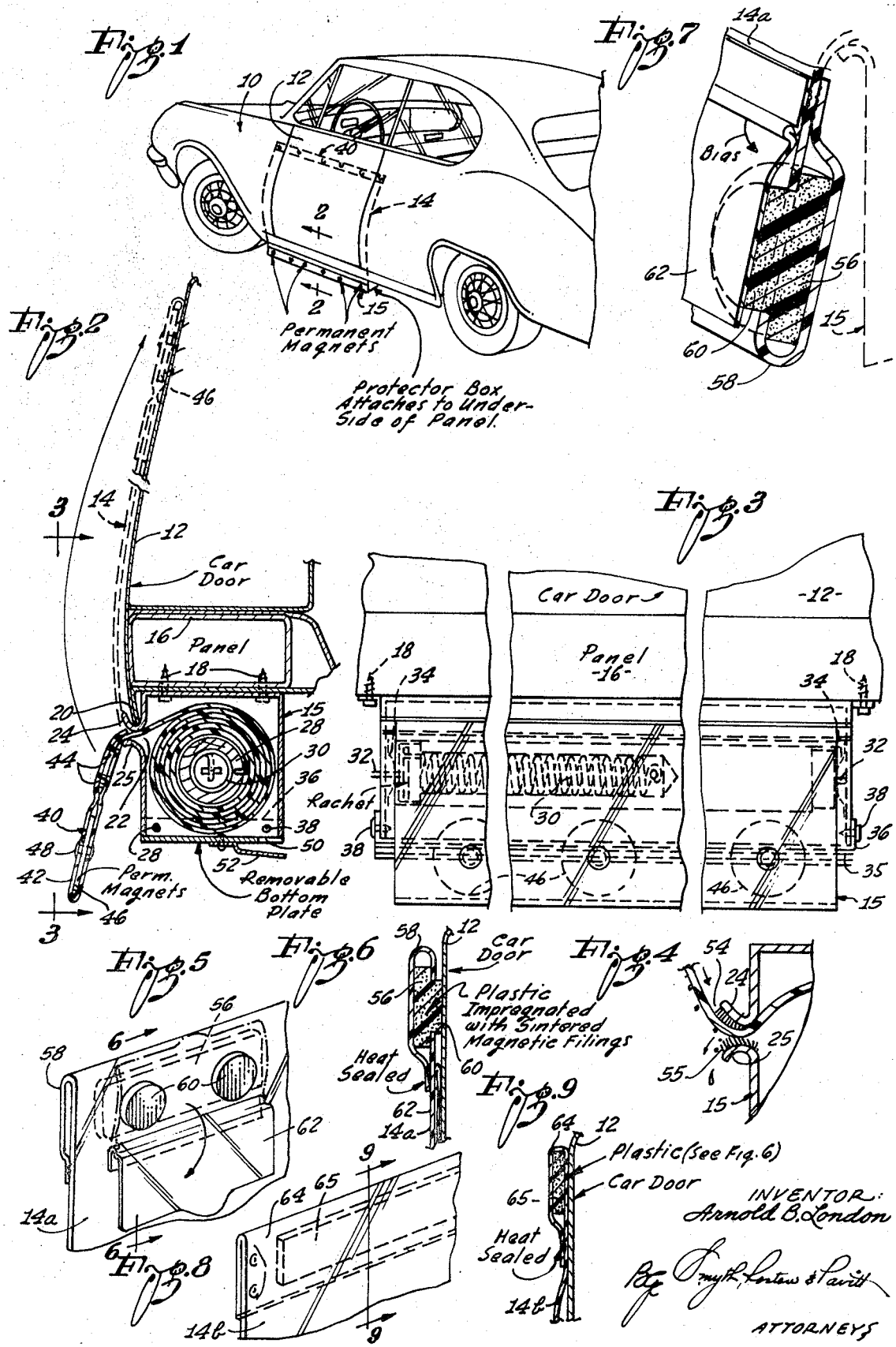

3,563,594

RETRACTABLE FLEXIBLE CAR BODY PROTECTOR

BACKGROUND OF THE INVENTION

It is well known that the marring of the side surfaces of automobile bodies occurs more often in public parking spaces than elsewhere. It is a common experience to have the side door of an automobile marred and dented when the door of a second adjacent automobile is carelessly swung open and too often both the appearance and value of an expensive brand-new automobile are deteriorated in this manner.

The object of the present invention is to provide a protective sheet for this purpose. In the attainment of this object, the invention solves certain problems that include: the problem of storing the protective sheet out of the way when not in use; the problem of quickly and conveniently extending the sheet for use or for retracting the sheet when it is not required; the problem of releasably anchoring the extended sheet to the automobile body without marring the surface finish of the body; the problem of providing for easy and convenient replacement of the protective sheet when desired; and the problem of preventing the accumulation of foreign particles on the leading edge of the retracted sheet.

SUMMARY OF THE INVENTION

An elongated protective storage casing is mounted on the lower portion of one side of the automobile body longitudinally thereof, the casing being provided with a longitudinal opening through which a protective sheet is movable for extension up the side surface of the body and for retraction into storage into the casing. Roller means inside the casing is provided on which the protective sheet is wound, the roller incorporating spring means to actuate the roller for winding up the protective sheet in the same manner that a spring-actuated roller is employed to wind up a household window shade.

Suitable means is employed to releasably anchor the leading end of the sheet to the surface of the automobile when the sheet is extended upward to its effective position and in the preferred embodiment of the invention such a holding means is in the form of permanent magnet means for releasable magnetic coupling with the ferrous material of the automobile body. The sheet includes at least one layer of a suitable flexible and somewhat resilient plastic such as a vinyl plastic which may, if desired, be backed by a fabric layer. In the preferred practice of the invention, the protective sheet comprises a single layer of a substantially clear plastic that permits the color of the automobile body finish to show through the plastic sheet, this feature desirably making the plastic sheet inconspicuous.

The features and advantages of the invention may be understood from the following detailed description and the accompanying drawing.

BRIEF DESCRIPTION OF THE DRAWING

In the drawing, which is to be regarded as merely illustrative:

FIG. 1 is a fragmentary perspective view of a parked automobile showing in dotted lines how the protective sheet may be retractably extended upward from a casing under the automobile body;

FIG. 2 is an enlarged cross section taken as indicated by the line 2—2 of FIG. 1 showing how the retracted sheet is wound on a spring-actuated roller in the storage casing;

FIG. 3 is a fragmentary elevational view as seen along the line 3—3 of FIG. 2;

FIG. 4 is an enlarged sectional view showing how the longitudinal opening of the casing through which the protective sheet extends may be provided with brush means to remove foreign material from the protective sheet as the protective sheet is being retracted into the casing;

FIG. 5 is a fragmentary perspective view illustrating a modification of the invention wherein the poles of permanent magnets protrude through openings in a hem on the leading edge portion of the protective sheet;

FIG. 6 is a fragmentary section taken as indicated by the line 6—6 of FIG. 5;

FIG. 7 is a fragmentary view partly in perspective and partly in section showing how a leading edge portion of the protective sheet illustrated in FIGS. 5 and 6 normally hang from the casing in which the sheet is stored;

FIG. 8 is a fragmentary perspective view of a modification of the invention wherein a permanent magnet in the form of an elongated plastic member is housed in a hem in the leading edge portion of the protective sheet; and FIG. 9 is a section taken as indicated by the line 9—9 of FIG. 8.

DESCRIPTION OF THE PREFERRED EMBODIMENTS OF THE INVENTION

Referring first to the embodiment of the invention illustrated by FIGS. 1—3, FIG. 1 shows the body 10 of an automobile having a side door 12 and further shows in phantom how a protective sheet, generally designated 14, may extend retractably upward from a longitudinal storage casing 15 under the vehicle body. As shown in cross section in FIG. 2, the automobile body 10 incorporates a longitudinal hollow panel 16 under the side edge of the body and the storage casing 15 is releasably secured to this panel by suitable screws 18. In the construction shown, the automobile body has a downwardly extending longitudinal flange 20 below the hollow panel and the storage casing 15 has a longitudinal opening 22 just below this flange through which the protective sheet 14 extends. Preferably the sheet material of the casing is turned upward along the upper edge of the longitudinal opening 22 to form a rounded lip 24 that encloses the bottom edge of the flange 20 and thus protects the sheet material from the bottom edge of the flange. The lower edge of the longitudinal opening 22 is turned in the same general manner to form a lower rounded lip 25.

As indicated in FIG. 2, the protective sheet is normally retracted into the storage casing 15 with the major portion of the sheet wound onto a roller 28 that incorporates a coil spring 30 for winding rotation of the roller. The roller is of the general construction of a well-known roller that is commonly employed for household window shades and need not be described in detail. The opposite ends of the roller 28 are provided with flat axial extensions 32 which support the roller in a well-known removable manner in slots of end brackets 34 inside the casing.

It is contemplated that a portion of the storage casing 15 will be removable to permit access to the interior of the casing for replacing a roller and the protective sheet thereon when desired. For this purpose the storage casing 15 may be provided with a bottom wall 35 having upwardly extending end flanges 36 that are releasably connected to the end walls of the casing by suitable screws 38.

When the protective sheet 14 is retracted and wound onto the roller 28, a leading edge portion 40 of the protective sheet protrudes through the longitudinal opening 22 as shown in FIG. 2, this leading edge portion serving as a handle or manual means for pulling the protective sheet upward to its effective position that is shown in phantom in FIGS. 1 and 2. It is contemplated that the leading edge portion 40 will be provided with stop means for cooperation with at least one edge of the longitudinal opening 22 to keep the leading edge portion from being drawn into the interior of the storage casing. In the construction shown in FIG. 2, the longitudinal opening 22 of the storage casing is of sufficient width to pass one layer of the protective sheet but is not of sufficient width to pass three layers. The leading edge portion 40 of the sheet is formed by a separate strip 42 of sheet material which is folded and secured to an intermediate layer of the sheet material by suitable stitching 44 to form a hem, the added strip thus providing a desired three-layer stop means.

For the purpose of releasably anchoring the upper end of the extended sheet against the side of the automobile body and/or against the side door 12, a series of disc-shaped metal permanent magnets 46 are anchored inside the hem of the leading edge portion 49 of the sheet. As shown in FIG. 2, the permanent magnets may be apertured and may be secured by suitable rivets 48.

In inclement weather moisture may enter the longitudinal opening 22 of the casing and/or may be dragged into the interior of the casing by adherence to the protective sheet when the protective sheet is retracted into the casing. For this reason, the removable bottom wall 35 of the storage casing is preferably provided with a series of small drainage ports 50. Fig. 2 indicates how a baffle 52 may be riveted to the underside of the bottom wall 35 below the drainage ports 50 to prevent foreign material from being thrown upward into the interior of the storage casing 15 when the automobile is traveling.

The manner in which this embodiment serves its purpose may be readily understood from the foregoing description. Normally the protective sheet is not in use and, therefore, is wound onto the roller 28 with the leading edge portion 40 of the protective sheet hanging free outside of the casing. When the automobile is parked at a location where it may be damaged by the swinging doors of adjacent automobiles, the leading edge portion of the protective sheet is grasped for the purpose of pulling the sheet upward to its effective position. When the protective sheet is extended upward to the desired degree, the sheet may be effectively anchored in its protective position by simply placing the leading edge portion 40 of the sheet against the sidewall of the automobile body to permit the permanent magnets 40 to effect magnetic coupling with the automobile body. To return the protective sheet to its normal stored position it is merely necessary to "peel" the leading edge portion 40 of the protective sheet away from the surface of the automobile body and then to give the protective sheet a slight tug to release the coil spring 30 in a well known manner to actuate the roller to wind up the protective sheet until the thickened leading edge portion of the protective sheet makes stop abutment with at least one of the edges of the longitudinal casing opening 22.

FIG. 4 shows how the two rounded lips 24 and 25 of the storage casing 15 may be provided with upper and lower brushes 54 and 55 respectively to dislodge adhering foreign particles from the surface of the protective sheet as it is retracted into the interior of the casing.

FIGS. 5—7 show how a series of elongated magnets 56, which are preferably made of flexible plastic material, may be substituted for the previously mentioned permanent disc magnets 46. Each of the elongated magnets 54 is encased in a hem 58 that forms the leading edge portion 58 of a protective sheet 14a and each of the magnets has a pair of spaced integral pole pieces 60 of circular cross section which extend through corresponding circular apertures in the hem.

The leading edge portion 58 of the sheet 14a may be provided with a series of protective flaps 62 adjacent the respective magnets 56 to overlie the pole pieces 60 of the magnets when the protective sheet is retracted into the storage casing with the leading edge portion hanging outside of the casing. The flaps 62 normally hang downward as shown in FIG. 7 to protect the pole pieces of the permanent magnets 56 while the automobile is traveling. The flaps 62 are readily swung down out of the way as shown in FIGS. 5 and 6 when the sheet 14a is extended upward for magnetic anchorage to the side surface of the automobile body. Both the flaps 62 and the protective sheet 14a may be made of a single layer of plastic material and the flaps may be crimped on themselves to form hinges 63 that permits the flaps to swing freely to their two alternate positions by gravity. Thus when the protective sheet is retracted into the casing 15 the flaps gravitate downward as shown in FIG. 7 to protect the permanent magnets and when the protective sheet is extended upward the protective flaps 62 gravitate downward out of the way as shown in FIGS. 5 and 6.

FIGS. 8 and 9 indicate how the leading edge portion of a protective sheet 14b may be folded over and bonded to form a hem 64 for enclosure of a permanent magnet 65 that extends for substantially the full width of the protective sheet. The permanent magnet 65 is a strip of plastic material that is sufficiently flexible to readily conform to the contour of the automobile body.

My description in specific detail of the selected embodiments of the invention will suggest various changes, substitutions and other departures from my disclosure.

I claim:

1. A vehicle having thereon an accessory for protecting the surface of the side of the body of a vehicle against impact damage while the vehicle is parked, comprising in combination:

an elongated protective storage casing mounted below the lower edge of the side of the vehicle body, on a frame member thereof and extending longitudinally of the body and located thereunder with its outer portion substantially flush with the said surface;

said casing having a longitudinal opening substantially at said lower edge;

a protective sheet normally stored in said casing with a leading edge portion protruding through said opening, whereby the leading edge portion may serve as manual means to extend the sheet upward from the casing to a protective position over the surface of said side of the body;

roller means inside the casing mounting the protective sheet to roll up the sheet when the protective sheet is retracted into the casing;

spring means to actuate said roller means to roll up the protective sheet; and holding means on said leading edge portion of the sheet to hold the leading edge portion against said body when the sheet is in its upwardly extended protective position.

2. The combination defined in claim 1 in which said leading edge portion of the sheet is provided with a stop means thereon to engage the edge of said opening and thereby prevent said leading edge from entering said casing.

3. The combination defined in claim 1 in which said lower edge comprises a downwardly extending flange, the upper rim of said longitudinal opening of said casing comprises a flange curved outwardly and upwardly around the bottom edge of said downwardly extending flange.

4. The combination defined in claim 1 wherein said holding means comprises permanent magnet means for releasable magnetic coupling with ferrous metal on the vehicle body.